(12) United States Patent
Flynn et al.

(10) Patent No.: US 9,229,727 B2
(45) Date of Patent: Jan. 5, 2016

(54) INTERACTIVE DISPLAY DEVICE

(71) Applicant: Cellco Partnership, Basking Ridge, NJ (US)

(72) Inventors: Michael R. Flynn, Norwood, MA (US); Gagan Puranik, Northborough, MA (US)

(73) Assignee: Cellco Partnership, Basking Ridge, NJ (US)

( * ) Notice: Subject to any disclaimer, the term of this patent is extended or adjusted under 35 U.S.C. 154(b) by 260 days.

(21) Appl. No.: 13/860,949

(22) Filed: Apr. 11, 2013

(65) Prior Publication Data

US 2014/0310650 A1    Oct. 16, 2014

(51) Int. Cl.
*G06F 3/00* (2006.01)
*G06F 3/048* (2013.01)
*G06F 9/44* (2006.01)
*G06F 3/0481* (2013.01)

(52) U.S. Cl.
CPC ............... *G06F 9/44* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 6,766,363 B1* | 7/2004 | Rothschild | 709/219 |
| 7,303,129 B2* | 12/2007 | Welch | 235/462.07 |
| 7,503,477 B2* | 3/2009 | Johnson | 235/375 |
| 7,996,282 B1* | 8/2011 | Scott et al. | 705/27.2 |
| 2002/0000998 A1* | 1/2002 | Scott et al. | 345/667 |
| 2002/0105551 A1* | 8/2002 | Kamen et al. | 345/850 |
| 2002/0118226 A1* | 8/2002 | Hough et al. | 345/764 |
| 2003/0195800 A1* | 10/2003 | Peters | 705/14 |
| 2004/0021682 A1* | 2/2004 | Pryor | 345/709 |
| 2004/0252119 A1* | 12/2004 | Hunleth et al. | 345/440 |
| 2005/0005241 A1* | 1/2005 | Hunleth et al. | 715/720 |
| 2005/0210399 A1* | 9/2005 | Filner et al. | 715/767 |
| 2006/0156228 A1* | 7/2006 | Gallo et al. | 715/523 |
| 2006/0161863 A1* | 7/2006 | Gallo | 715/810 |
| 2007/0101291 A1* | 5/2007 | Forstall et al. | 715/805 |
| 2009/0307091 A1* | 12/2009 | Lilley | 705/14.58 |
| 2010/0063891 A1* | 3/2010 | Townsend et al. | 705/26 |
| 2012/0029994 A1* | 2/2012 | Barkan et al. | 705/14.25 |
| 2012/0123910 A1* | 5/2012 | George | 705/27.1 |
| 2014/0136549 A1* | 5/2014 | Surya et al. | 707/749 |

* cited by examiner

*Primary Examiner* — Yongjia Pan

(57) ABSTRACT

A device is configured to receive information that identifies entity representations, receive first entity information associated with a first entity representation, and receive second entity information associated with a second entity representation. The device is configured to generate a first tag associated with the first entity representation, and generate a second tag associated with the second entity representation. The device is configured to receive user input information including information regarding user selections of entity representations, determine a relationship between the first tag and the second tag, and store an association between the first and second entity representations. The device is configured to detect an interaction associated with the first entity representation, and to provide the second entity representation based on the interaction and based on the association between the first and the second entity representations.

20 Claims, 12 Drawing Sheets

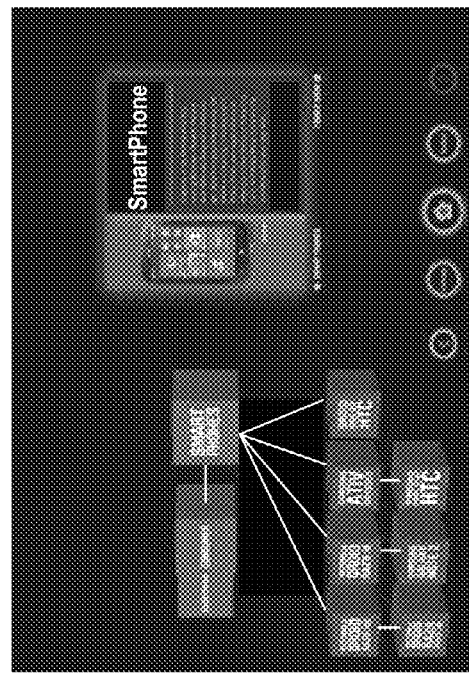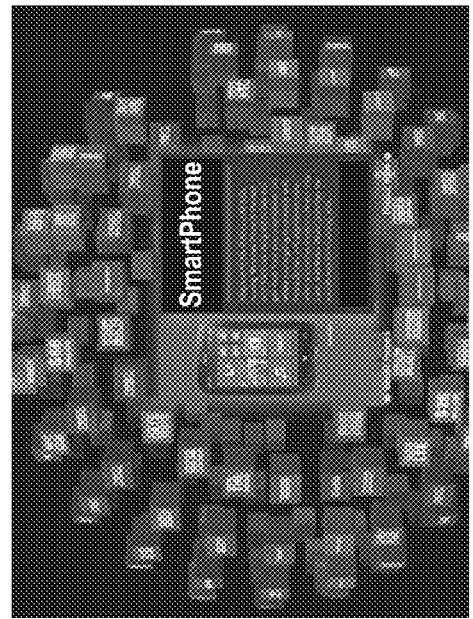
FIG. 11B

INTERACTIVE DISPLAY DEVICE

BACKGROUND

A user of a display device (e.g., a computer, a smartphone, etc.) may view information about various entities (e.g., products, services, devices, etc.) on a user interface associated with the display device. The user may select one or more entity representations (e.g., visual representations of the entities), and the display device may display one or more related entity representations (e.g., related products, related services, related devices, etc.).

BRIEF DESCRIPTION OF THE DRAWINGS

FIGS. 11A and 11B are diagrams of an example implementation relating to the example processes shown in FIGS. 4 and 7.

DETAILED DESCRIPTION OF PREFERRED EMBODIMENTS

The following detailed description of example implementations refers to the accompanying drawings. The same reference numbers in different drawings may identify the same or similar elements.

An association device (e.g., a computer, a server, etc.) may provide entity representations (e.g., textual and/or visual representations of objects, products, services, etc.) for display on a user interface (e.g., a touchscreen display). When a user of the user interface selects a first entity representation, the association device may provide a second entity representation, based on an association between the first entity representation and the second entity representation.

The association between the first and second entity representations may be based on a predefined relationship (e.g., a hierarchy) that is static (e.g., does not change with time), and users of the association device may be confined to viewing the first and second entity representations based on the predefined relationships. Implementations described herein may allow an association device to form associations between entity representations based on evolving information about the entity representations, and to provide the entity representations based on the associations.

Figure 1:
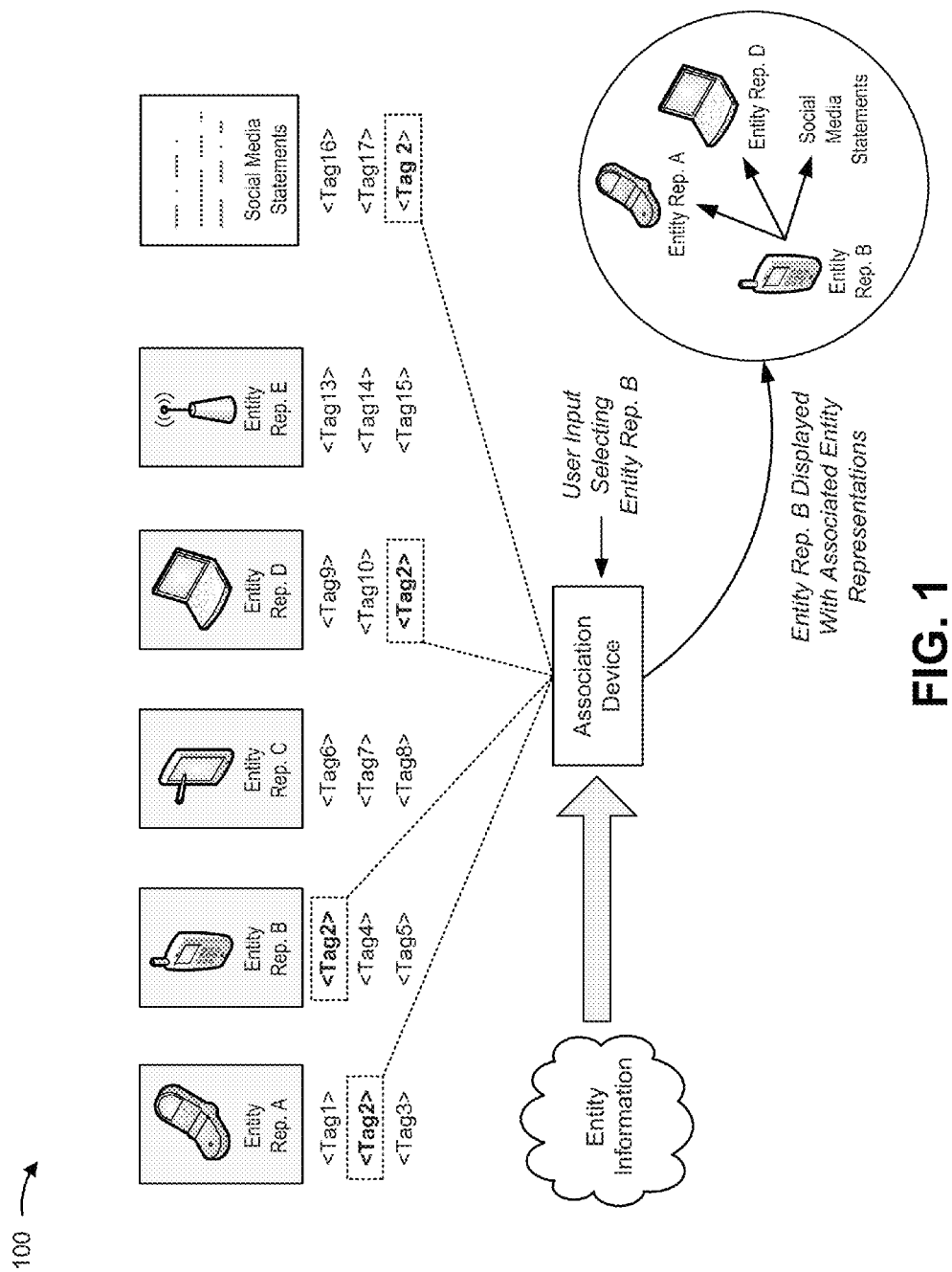
FIG. 1 is a diagram of an overview of an example implementation described herein.

FIG. 1 is a diagram of an example implementation 100 described herein. As shown in FIG. 1, example implementation 100 may include a quantity of entity representations and corresponding tags, a quantity of social media statements, and an association device, such as a computer with a touchscreen display.

As shown in FIG. 1, the entity representations may correspond to images of communication devices displayed on a touchscreen display. The association device may receive entity information (e.g., device information, social media statements about the devices, etc.) associated with the entity representations. The association device may use the entity information to generate a quantity of tags associated with the entity representations. The tags may include keywords, categories, features, or the like, associated with the entity representations. The association device may detect that several entity representations (e.g., "Entity Rep. A," "Entity Rep. B," "Entity Rep. D," and "Social Media Statements") share a common tag (e.g., "Tag 2"), and may store an association between the several entity representations.

As further shown in FIG. 1, the association device may receive user input (e.g., via the touchscreen display) selecting an entity representation (e.g., "Entity Rep. B"). Based on the selection, and based on the association between the selected entity representation and other entity representations, the association device may display the selected entity representation (e.g., "Entity Rep. B") along with the associated entity representations (e.g., "Entity Rep. A" and "Entity Rep. D") and social medial statements. In this manner, the association device may generate one or more associations between entity representations based on entity information and may provide the entity representations for display in an economy infrastructure (e.g., based on displaying entity representations according to associations between the entity representations, as opposed to displaying the entity representations in a hierarchy and/or according to categories).

Figure 2:
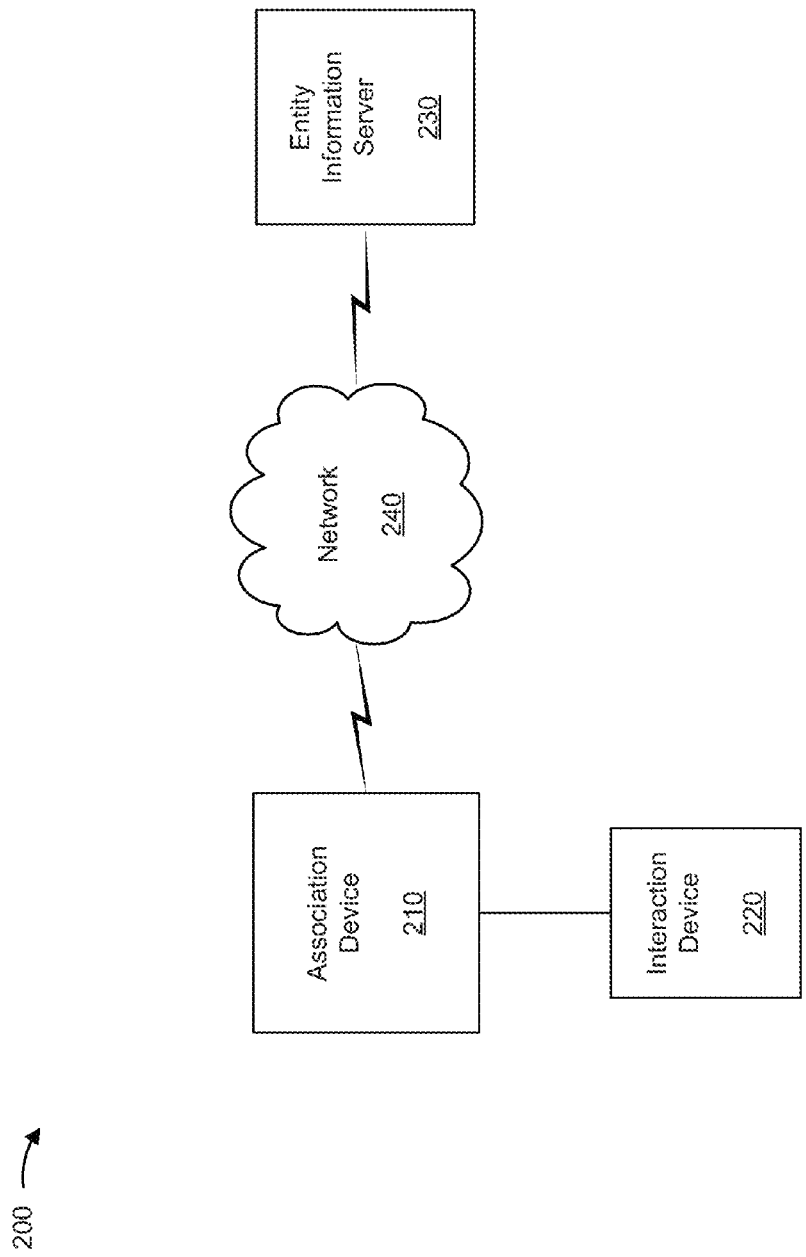
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an association device 210, an interaction device 220, an entity information server 230, and a network 240. Devices of environment 200 may interconnect via wired connections, wireless connections, or a combination of wired and wireless connections.

Association device 210 may include a device capable of generating and/or storing an association between two or more entity representations. For example, association device 210 may include a desktop computer, a laptop computer, a tablet computer, a handheld computer, or a similar device. In some implementations, association device 210 may include a display (e.g., a touchscreen display, etc.) capable of displaying one or more entity representations and/or one or more associations between entity representations. Association device 210 may receive user input (e.g., via a user interface), and may display one or more entity representations based on the user input.

Interaction device 220 may include a device capable of detecting an object and/or an interaction. For example, interaction device 220 may include a desktop computer, a laptop computer, a tablet computer, a handheld computer, or a similar device. In some implementations, interaction device 220 may be associated with a camera, a microphone, a motion detector, an infrared scanner, a barcode reader, a radio frequency identification (RFID) reader, or the like. Additionally, or alternatively, interaction device 220 may include a touchscreen device capable of detecting an object.

Entity information server 230 may include a device capable of receiving, processing, storing, and/or providing information, such as information relating to entity representations. For example, entity information server 230 may include one or more computation or communication devices, such as a server device. In some implementations, information server 230 may receive information from one or more Internet sites (e.g., social media sites, product review sites, discussion boards, etc.).

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, association device 210 and interaction device 220 may be implemented within a single device. Additionally, one or more of the devices of environment 200 may perform one or more functions described as being performed by another one or more devices of environment 200.

Figure 3:
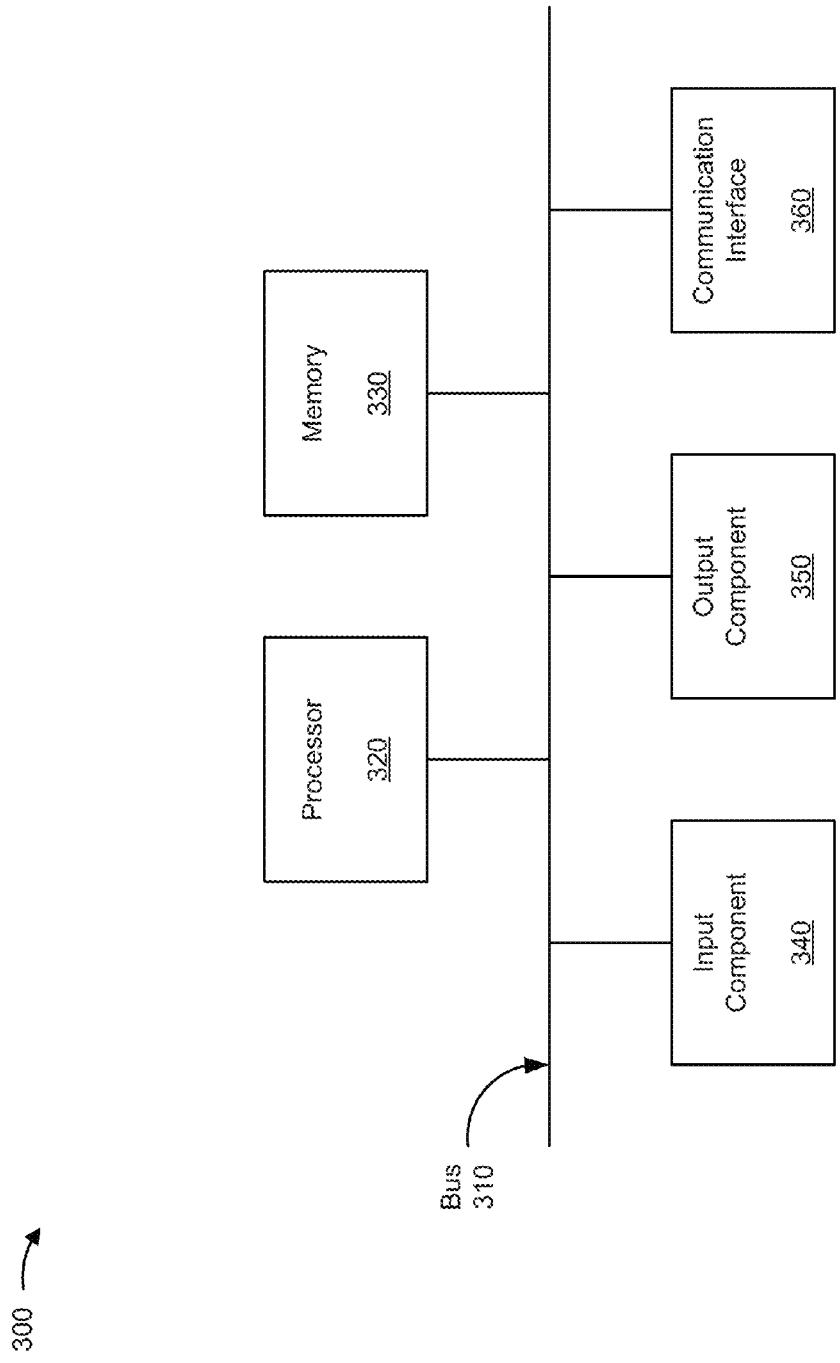
FIG. 3 is a diagram of example components of one or more devices of FIG. 2.

FIG. 3 is a diagram of example components of a device 300. Device 300 may correspond to association device 210, interaction device 220, and/or entity information server 230. Additionally, or alternatively, each of association device 210, interaction device 220, and/or entity information server 230 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
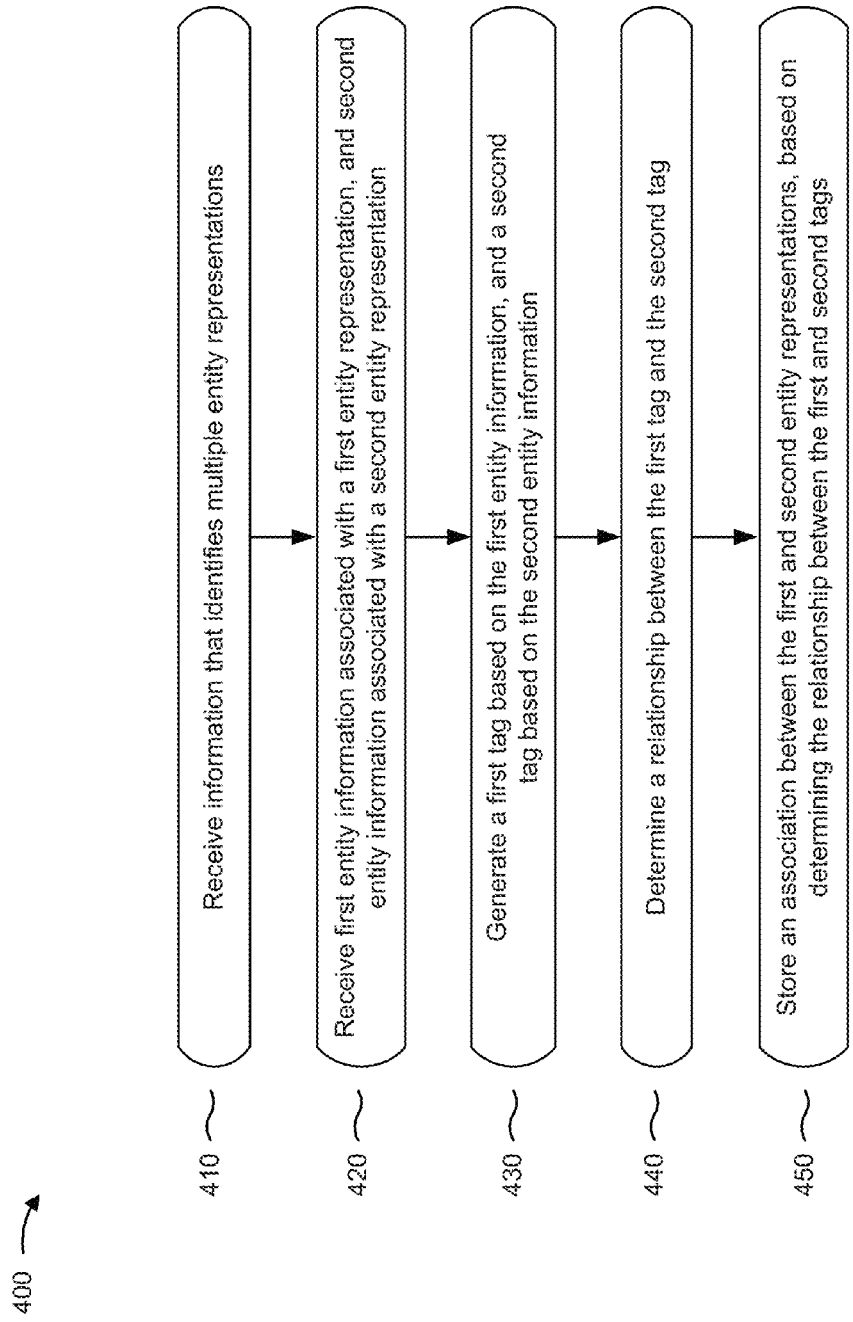
FIG. 4 is a flow chart of an example process for creating an association between two entity representations.

FIG. 4 is a flow chart of an example process 400 for creating an association between two entity representations. In some implementations, one or more process blocks of FIG. 4 may be performed by association device 210. Additionally, or alternatively, one or more process blocks of FIG. 4 may be performed by another device or group of devices separate from or including association device 210, such as interaction device 220 and/or entity information server 230.

As shown in FIG. 4, process 400 may include receiving information that identifies multiple entity representations (block 410). For example, association device 210 may receive information that identifies the entity representations. An entity representation may include a visualization (e.g., an image, a model, a textual description, etc.) of an entity (e.g., an object, an article, a product, a service, etc.). In some implementations, association device 210 and/or interaction device 220 may provide the entity representations for display (e.g., on a screen, on a monitor, via a user interface, etc.).

In some implementations, the entity representations may correspond to products related to a network service provider. For example, the entity representations may correspond to images of communication devices (e.g., cellular telephones, smartphones, etc.) and related peripherals (e.g., headphones, cellular telephone chargers, smartphone cases, etc.). In some implementations, association device 210 may receive the images from another device, such as interaction device 220 and/or entity information server 230. Additionally, or alternatively, association device 210 may receive the images from a user (e.g., a user of association device 210) and/or the Internet.

As further shown in FIG. 4, process 400 may include receiving first entity information associated with a first entity representation, and second entity information associated with a second entity representation (block 420). For example, association device 210 may receive first entity information and/or second entity information from interaction device 220 and/or entity information server 230.

In some implementations, the first and/or second entity information may be associated with the first and/or second entity representations, respectively. For example, the first entity representation may correspond to a first product (e.g., a particular model of smartphone), and the first entity information may include information that describes the first product (e.g., a list of smartphone features). The second entity representation may correspond to a second product (e.g., wireless headphones), and the second entity information may include information that describes the second product (e.g., a list of wireless headphone features).

In some implementations, the first and/or second entity information may include information relating to a communication device (e.g., a cellular telephone, a smartphone, etc.), such as a device name, a device description (e.g., a description, such as a size, a weight, a color, etc.), one or more device features (e.g., a video camera, a high resolution ("HD") display, a qwerty keyboard, etc.), one or more device specifications (e.g., a network type, a battery type, a memory capacity, etc.), or the like. Additionally, or alternatively, the first and/or second entity information may include user ratings. For example, a user may provide user ratings (e.g., via a survey, an internet website, etc.) about a product.

In some implementations, the first and/or second entity information may include information from one or more content sources. For example, association device 210 and/or entity information server 230 may receive and/or gather information from one or more other devices. The first and/or second entity information may include information from social media websites (e.g., Facebook, Twitter, Pinterest, etc.), product review websites, news stories, online discussion groups, or the like. In some implementations, association device 230 may receive the first and/or second entity information, and may generate one or more associations between the first and second entity representations, based on the first and second entity information. Additionally, or alternatively, association device 230 may receive updated first and/or second entity information at some frequency (e.g., the first and/or second entity information may evolve over time), and association device 230 may generate additional associations based on the updated information.

In some implementations, association device 210 may receive the first and/or second entity information by searching the Internet. For example, association device 210 may search the Internet for information associated with the first and/or second entity representations, such as product reviews, social media statements, or the like. Additionally, or alternatively, association device 210 may receive first and/or second entity information from a user (e.g., a user of association device 210, a user of interaction device 220, etc.). In some implementations, association device 210 may receive updated first and/or second entity information from interaction device 220 and/or entity information server 230. For example, association device 210 may receive additional first and/or second entity information at regular intervals (e.g., every hour) and/or when additional first and/or second entity information is available (e.g., when received by entity information server 230, when published on the Internet, etc.).

As further shown in FIG. 4, process 400 may include generating a first tag based on the first entity information, and a second tag based on the second entity information (block 430). For example, association device 210 may generate the first tag based on the first entity information, and the second tag based on the second entity information. The first and/or second tag may include a set of characters (e.g., letters, numbers, symbols, etc.), an image, an identifier, a notation (e.g., a java script object notation (JSON) object, an extensible markup language (XML) element), or the like.

In some implementations, association device 210 may generate the first and/or second tags based on keywords associated with the first and/or second entity information. For example, the first entity information may include information (e.g., product information) about the first entity representation (e.g., a representation of a product). Association device 210 may search the first entity information and may identify keywords (e.g., names, terms, descriptions, etc.) that correspond to a name associated with the first entity (e.g., a product name), a feature of the first entity (e.g., a product feature), a description of the first entity (e.g., a product description, a product color, a product size, etc.), or the like. In some implementations, association device 210 may identify keywords based on frequency (e.g., the frequency in which a term appears in the first entity information). Additionally, or alternatively, association device 210 may identify keywords by searching for one or more predefined terms (e.g., terms defined by a user, a programmer, etc.). Association device 210 may generate the first tag based on the one or more keywords (e.g., a first tag corresponding to the product name, a first tag corresponding to the product feature, a first tag corresponding to the product description, etc.). In the same manner, association device 210 may generate the second tag from one or more keywords associated with the second entity information.

In some implementations, association device 210 may generate the first and/or second tags based on a relationship between the first and second entity representations. For example, the first and/or the second tag may be a hierarchical tag designating the first and/or second entity representation as a member in a hierarchy (e.g., a hierarchy of entity representations). Additionally, or alternatively, the first and/or second tag may be a category tag designating the first and/or second entity representations as a member of a category (e.g., a category of entity representations). For example, association device 210 may determine that the first and second entity representations are members of the category based on keywords.

In some implementations, the first and/or second tag may designate a relationship between the first and second entity representations. For example, the first tag may designate the first entity representation as a child or parent of the second entity representation (e.g., the first tag may explicitly state that the first entity representation is child or parent of the second entity representation.) Additionally, or alternatively, association device 210 may designate the first entity representation as a child or parent of the second entity representation based on keywords determined from the first and/or second entity representation, input received from a user, or the like.

As further shown in FIG. 4, process 400 may include determining a relationship between the first tag and the second tag (block 440). For example, association device 210 may determine the relationship between the first tag and the second tag. In some implementations, association device 210 may determine the relationship between the first and second tags based on an association defined by a user (e.g., a user of association device 210, a user of interaction device 220, a programmer, etc.). For example, a user (e.g., a programmer) may determine the relationship (e.g., may code the relationship) between the first and second tags.

In some implementations, association device 210 may determine the relationship between the first and second tags based on determining that the first tag matches the second tag. For example, the first entity representation (e.g., a representation of a smartphone) may be associated with a first tag (e.g., a feature tag). Association device 210 may determine that a second entity representation (e.g., a representation of a tablet computer) may be associated with a second tag that matches the first tag. By detecting the matching tags, association device 210 may determine the relationship between the first and second tags (e.g., determine that the first and second tags are associated with a matching feature).

In some implementations, association device 210 may determine the relationship between the first and second tags based on a hierarchy. For example, the first and/or second tag may include an indication that the first and/or second entity representation is a member of a hierarchy (e.g., association device 210 may detect a hierarchy tag). Additionally, or alternatively, association device 210 may store a hierarchy (e.g., a hierarchy of product names), and may determine that the first and/or second entity representation is a member of the hierarchy based on the first and/or second tag (e.g., based on an entity representation name tag).

In some implementations, association device 210 may determine that the first and second tags identify a parent-child relationship. For example, the first tag may correspond to a first attribute (e.g., a feature, a condition, a description, etc.) associated with the first entity representation (e.g., a first attribute indicating that the first entity representation is a representation of a communication device). The second tag may correspond to a second attribute associated with the second entity representation (e.g., a second attribute indicating that the second entity representation is a representation of a cellular telephone). Association device 210 may determine that the first tag is a parent of the second tag (e.g., that the communication device is a parent of the cellular telephone), and may determine that the first entity representation is a parent of the second entity representation, based on the first and second tags.

In some implementations, the relationship between the first tag and the second tag may remain indefinitely (e.g., the relationship may be set initially and may remain for an extended period of time). Additionally, or alternatively, the relationship may evolve over time based on the first and/or second entity information (e.g., one or more relationships may be created and/or terminated as association device 210 receives additional first and/or second entity information).

In some implementations, association device 210 may determine the relationship between the first and second tags based on information gathered from the Internet, such as online product reviews, statements published to social media websites, online forums, online discussion groups, or the like. For example, association device 210 may receive one or more social media statements (e.g., status updates, text messages, etc.) associated with a first entity (e.g., a first product). Association device 210 may determine that a threshold number of the social media statements also mention a second entity (e.g., a second product). Based on this determination, association device 210 may determine that the first entity representation (e.g., a representation of the first product) and the second entity representation (e.g., a representation of the second product) are related.

In some implementations, association device 210 may determine the relationship between the first tag and the second tag based on the behavior of one or more users (e.g., one or more users of association device 210, interaction device 220, and/or entity information server 230). For example, the one or more users may select a series of entity representations (e.g., on a display). Association device 210 may receive a history of user selections (e.g., a record of selections of entity representations). Association device 210 may determine that one or more users (e.g., a threshold quantity and/or a percentage of users) select a first entity representation, and then select a second entity representation. Based on the history of user selections, association device 210 may determine that the first entity representation and the second entity representation are related.

As further shown in FIG. 4, process 400 may include storing an association between the first and second entity representations based on determining the relationship between the first and second tags (block 450). For example, association device 210 may store the association between the first and second entity representations in a data structure (e.g., a data structure associated with association device 210, interaction device 220, and/or entity information server 230). In some implementations, association device 210 may store the first entity representation, the second entity representation, and/or the relationship between the first and second entity representations. For example, association device 210 may store information that identifies a matching feature, a parent-child relationship, a category, or the like. Additionally, or alternatively, association device 210 may store tags that are related (e.g., tags that match, tags in a hierarchy, tags that specify a parent-child relationship, etc.).

While a series of blocks has been described with regard to FIG. 4, the blocks and/or the order of the blocks may be modified in some implementations. Additionally, or alternatively, non-dependent blocks may be performed in parallel.

Figure 5:
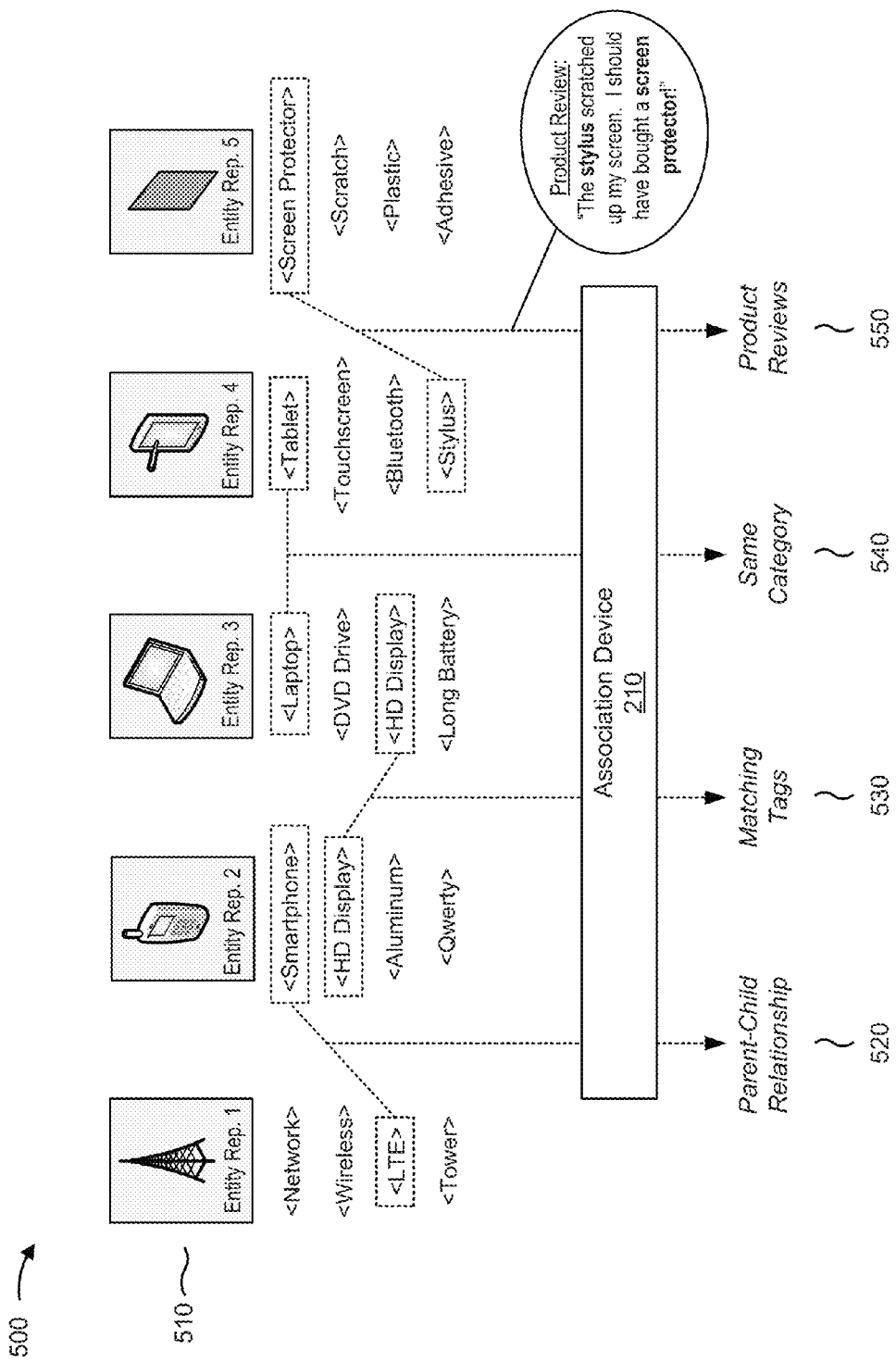
FIG. 5 is a diagram of an example implementation relating to the example process shown in FIG. 4.

FIG. 5 is a diagram of an example implementation 500 relating to process 400 shown in FIG. 4. In example implementation 500, association device 210 may receive information that identifies entity representations associated with cellular devices and networks. Association device 210 may generate tags, associated with the entity representations, based on entity information.

As shown by reference number 510, association device 210 may receive information that identifies the entity representations (e.g., a network representation, a smartphone representation, a laptop representation, a tablet representation, and a screen protector representation) associated with cellular devices and networks. Association device 210 may receive entity information (e.g., information associated with the cellular devices and networks) associated with the entity representations from interaction device 220 and/or entity information server 230. Association device 210 may use the entity information to generate tags associated with the network representation (e.g., <Network>, <Wireless>, <LTE>, and <Tower>), tags associated with the smartphone representation (e.g., <Smartphone>, <HD Display>, <Aluminum>, and <Qwerty>) tags associated with the laptop representation (e.g., <Laptop>, <DVD Drive>, <HD Display>, and <Long Battery>), and so forth for the remaining entity representations. Association device 210 may determine a relationship between two or more of the tags.

As shown by reference number 520, association device 210 may determine a parent-child relationship between two tags. Association device 210 may detect an <LTE> tag associated with the network representation and a <Smartphone> tag associated with the smartphone representation. Association device 210 may determine that the <LTE> tag (e.g., a tag describing a type of network) is a parent of the <Smartphone> tag (e.g., a tag describing a device that uses the network) based on the relationship between the two tags.

As shown by reference number 530, association device 210 may determine a relationship between tags by detecting matching tags. Association device 210 may detect an <HD Display> tag associated with the smartphone representation, and an <HD Display> tag associated with the laptop representation. Association device 210 may determine that the tags match (e.g., that a smartphone associated with the smartphone representation and a laptop associated with the laptop representation share a matching feature).

As shown by reference number 540, association device 210 may determine that two tags are associated with a single category. Association device 210 may detect a <Laptop> tag associated with the laptop representation, and a <Tablet> tag associated with the tablet representation. Association device 210 may determine that the tags are members of a common category (e.g., a category of computing devices) based on the tags (e.g., by determining that "Laptop" and "Tablet" are types of computing devices).

As shown by reference number 550, association device 210 may determine a relationship between tags based on product reviews published on the Internet. Association device 210 may receive a <Stylus> tag associated with the tablet representation, and a <Screen Protector> tag associated with a screen protector representation. Association device 210 may receive external information (e.g., information including the text of the product review). Association device 210 may detect words in the product view (e.g., "stylus" and "screen protector") that match the <Stylus> and <Screen Protector> tags. Based on the product review, association device 210 may determine the relationship between the tags.

Figure 6:
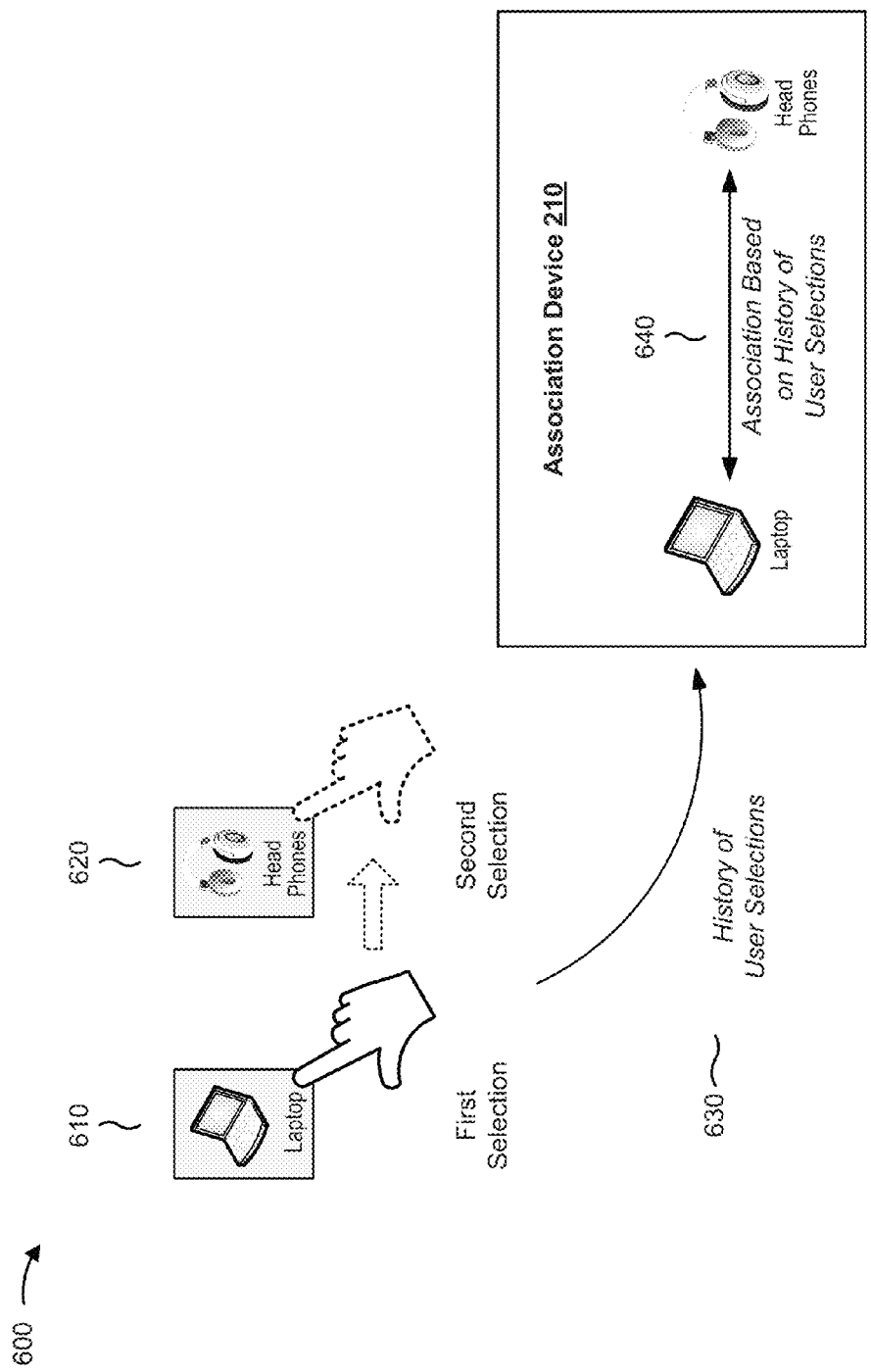
FIG. 6 is a diagram of another example implementation relating to the example process shown in FIG. 4.

FIG. 6 is a diagram of an example implementation 600 relating to process 400 shown in FIG. 4. In example implementation 600, association device 210 may determine a relationship between a first entity representation and a second entity representation based on a history of user selections.

As shown by reference number 610, association device 210 may display a representation of a laptop on a touchscreen display. A user may select the laptop representation (e.g., by touching a portion of the touchscreen display that displays the laptop representation). As shown by reference number 620, the user may subsequently select a representation of headphones. This pairing of selections by the user (e.g., the selection of the laptop representation followed by the selection of the headphones representation) may be recorded as a history of user selections. The history of user selections may include selections from multiple users. As shown by reference number 630, association device 210 may receive the history of user selections.

As shown by reference number 640, association device 210 may use the history of user selections to determine a combination of selections (e.g., a selection of the laptop representation followed by a selection of the headphones representation) that occur with some quantity or threshold of frequency. Association device 240 may store an association between the laptop representation and the headphones representation, based on the history of user selections (e.g., based on determining that previous users frequently select the laptop and headphones representations together).

Figure 7:
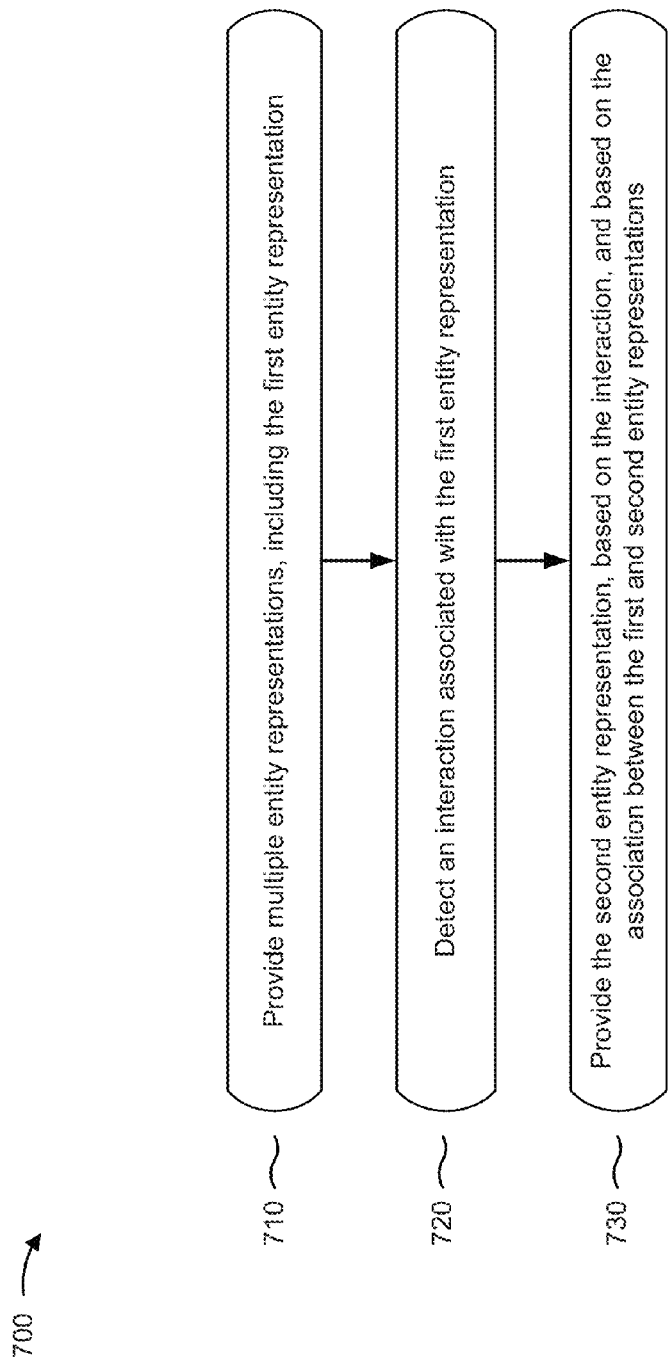
FIG. 7 is a flow chart of an example process for providing the first and second entity representations for display.

FIG. 7 is a flow chart of an example process 700 for providing the first and second entity representations for display. In some implementations, one or more process blocks of FIG. 7 may be performed by association device 210. Additionally, or alternatively, one or more process blocks of FIG. 7 may be performed by another device or a group of devices separate from or including association device 210, such as interaction device 220 and/or entity information server 230.

As shown in FIG. 7, process 700 may include providing multiple entity representations, including the first entity representation (block 710). For example, association device 210 may provide the entity representations, including the first entity representation, for display, and/or to another device for display.

In some implementations, association device 210 may provide the entity representations (e.g., product images, product descriptions, etc.) on a display (e.g., a computer screen, a computer monitor, a cellular phone screen, etc.). The entity representations may include the first entity representation. In some implementations, the display may be associated with a user interface associated with association device 210. Additionally, or alternatively, the display may be associated with another device, such as interaction device 220.

As further shown in FIG. 7, process 700 may include detecting an interaction associated with the first entity representation (block 720). For example, association device 210 may detect the interaction by receiving input from a user (e.g., a user of association device 210, a user of interaction device 220, etc.). Association device 210 may provide the first entity representation for display (e.g. on a computing device), and may receive input from the user selecting the first entity representation.

In some implementations, the first entity representation may be displayed on a touchscreen display. Association device 210 may detect the interaction associated with the first entity representation by detecting that the user has selected (e.g., touched) the first entity representation on the touchscreen display. In some implementations, association device 210 may display additional information associated with the first entity representation (e.g., an image, a name, a description, etc.), based on detecting the interaction.

In some implementations, association device 210 may detect the interaction associated with the first entity representation by detecting voice input (e.g., voice commands) from a user (e.g., a user of association device 210, a user of interaction device 210, etc.). For example, the user may speak one or more words indicating that the user has selected the first entity representation. Association device 210 may detect the audible statements (e.g., via a microphone), and may determine (e.g., using voice-to-text software, speech recognition software, etc.) that the first entity representation has been selected.

In some implementations, association device 210 may detect the interaction associated with the first entity representation by detecting a placement of a physical object. For example, the user may place the physical object (e.g., an object corresponding to the first entity representation) near a sensor (e.g., near interaction device 220). Additionally, or alternatively, association device 210 may detect the interaction by detecting the movement of the user. For example, association device 210 may detect (e.g., using a video camera, a motion detection device, etc.) that the user is in proximity with the first entity representation (e.g., that the user has moved closer to the first entity representation).

In some implementations, association device 210 may display the entity representations on the screen in a rest mode (e.g., in an ambient mode). For example, association device 210 may display the entity representations in a manner to attract attention (e.g., by scrolling through popular entity representations, by displaying attributes associated with the entity representations, etc.). Association device 210 may display the entity representations until a user (e.g., a user of association device 210, a user of interaction device 220, etc.) has interacted with the first entity representation.

In some implementations, based on detecting the interaction, association device 210 may enter a mode that allows the user to select one or more entity representations (e.g., a presenter mode). Additionally, or alternatively, association device 210 may detect two or more users (e.g., may detect that there are two or more users of the user interface), and may separate the user interface into two or more interaction areas (e.g., a multi-user mode). Association device 210 may display the entity representations on each of the interaction areas (e.g., on each portion of the user interface associated with one of the two or more users).

As further shown in FIG. 7, process 700 may include providing the second entity representation based on the interaction and based on the association between the first and second entity representations (block 730). For example, association device 210 may provide the second entity representation for display (e.g., a display associated with association device 210, interaction device 220, etc.) based on the interaction and based on the association between the first and second entity representations. In some implementations, association device 210 may provide the first entity representation for display, and may provide the second entity representation for display based on detecting the interaction associated with the first entity representation, and based on the association (e.g., the association stored by association device 210) between the first and second entity representations.

In some implementations, association device 210 may provide the first and second entity representations along with other entity representations, and may rearrange the first and/or second entity representations based on detecting the interaction, and based on the association between the first and second entity representations. For example, association device 210 may provide the entity representations on a display (e.g., a touchscreen display), including the first and second entity representations. Association device 210 may detect the interaction associated with the first entity representation by detecting that a user of the display has selected (e.g., touched) the first entity representation. Based on detecting the interaction and based on the association between the first and second entity representations association device 210 may rearrange a portion of the entity representations so that the second entity representation is closer to the first entity representation. Additionally, or alternatively, association device 210 may highlight the second entity representation, based on the interaction associated with the first representation, by changing a visual aspect of the second entity representation (e.g., by changing one or more colors associated with the second entity representation, by changing the size of the second entity representation, by changing text associated with the second entity representation, etc.).

In some implementations, association device 210 may provide additional information associated with the first and/or second entity representation. For example, association device 210 may provide statements from social media about the first and/or second entity, product reviews discussing the first and/or second entity, news articles associated with the first and/or second entity, or the like.

In some implementations, association device 210 may display the entity representations based on associations between a portion of the entity representations. Additionally, or alternatively, association device 210 may display the entity representations according to parent-child associations (e.g., in a hierarchy), and/or according to associations with one or more categories (e.g., in a categorical system). In some implementations, association device 210 may change from one display structure to another display structure (e.g., may toggle between an economy system view, a hierarchical view, and/or a categorical system view). For example, association device 210 may display associated entity representations in an economy system view. The user may provide user input indicating that the associated entity representations are to be displayed in a hierarchical view, and association device 210 may display the associated entity representations in the hierarchical view, based on the user input.

While a series of blocks has been described with regard to FIG. 7, the blocks and/or the order of the blocks may be modified in some implementations. Additionally, or alternatively, non-dependent blocks may be performed in parallel.

Figure 8:
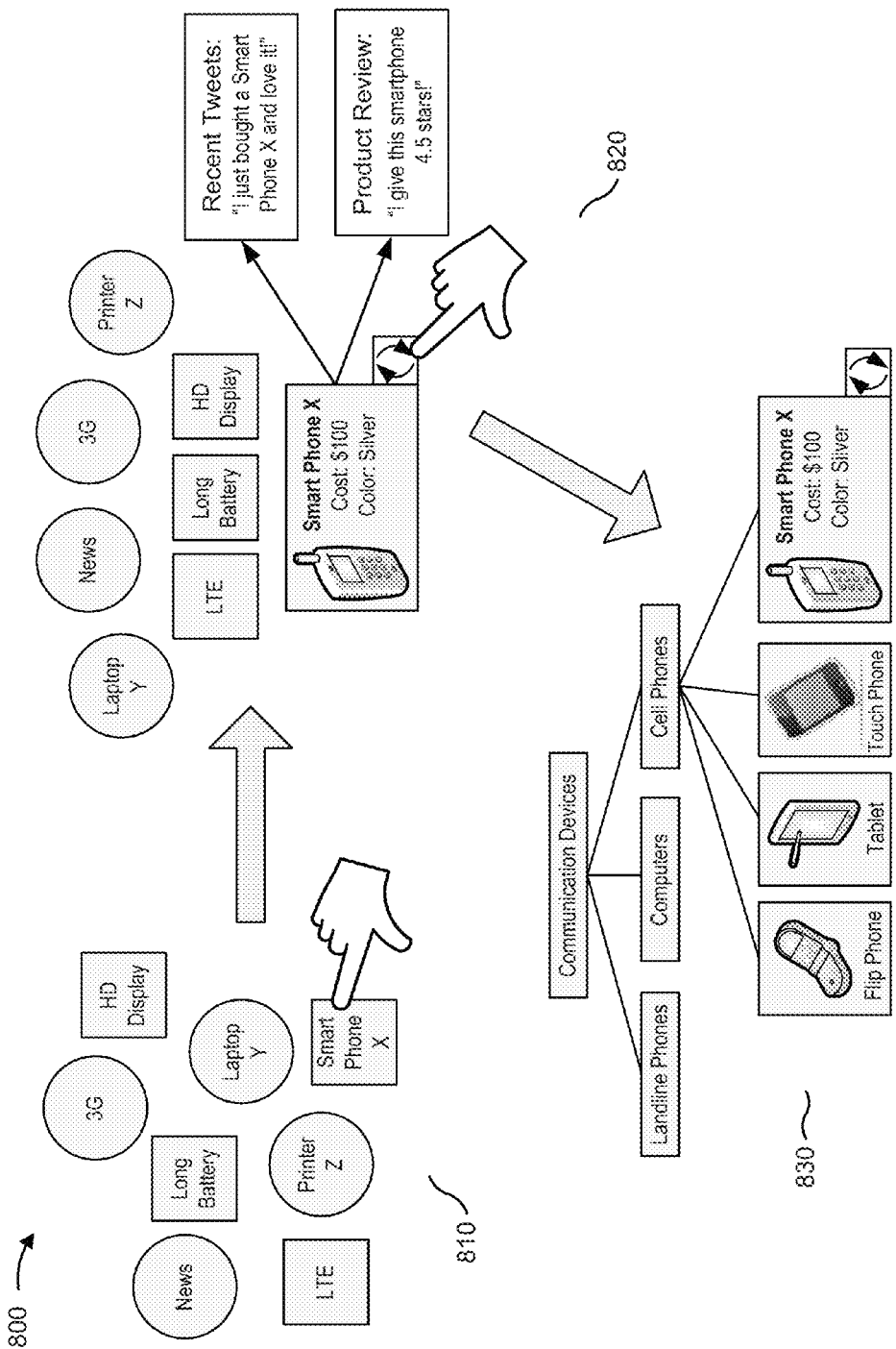
FIG. 8 is a diagram of an example implementation relating to the example process shown in FIG. 7.

FIG. 8 is a diagram of an example implementation 800 relating to process 700 shown in FIG. 7. In example implementation 800, association device 210 may provide entity representations on a touchscreen display, including a first entity representation. Based on an interaction from a user of the touchscreen display, association device 210 may rearrange a portion of the entity representations based on one or more associations between the first entity representation and other entity representations.

As shown by reference number 810, association device 210 may provide entity representations on a touchscreen display. The entity representations may include a "Smart Phone X" representation corresponding to a smartphone for sale. The entity representations may include other entity representations, such as an "LTE" representation, a "Long Battery" representation, and an "HD Display" representation, associated with the "Smart Phone X" representation (e.g., the associated entity representations may correspond to features possessed by the smartphone). Association device 210 may detect an interaction with the "Smart Phone X" representation by detecting that the user has selected the "Smart Phone X" representation by touching the representation on the touchscreen display.

As shown by reference number 820, association device 210 may display additional information (e.g., an image, a cost, and a color) associated with the "Smart Phone X" representation. Association device 210 may rearrange a portion of the entity representations, based on detecting the interaction associated with the first interaction (e.g., by detecting that the user has selected "Smart Phone X" on the touchscreen display). Based on the associations between the "Smart Phone X" representation and other entity representations, association device 210 may place the "LTE" representation, the "Long Battery" representation, and the "HD Display" representation (e.g., those entity representations having an association with the "Smart Phone X" representation) closer to the "Smart Phone X" representation on the display. Association device 210 may also display external information (e.g., "Recent Tweets," and "Product Review") associated with the "Smart Phone X" representation published on the Internet. Those entity representations (e.g., "Laptop Y," "News," "3G," and "Printer Z") without an association with the "Smart Phone X" representation may be placed further from the "Smart Phone X" representation on the display.

As shown by reference number 830, the user may select (e.g., by pressing a button on the touchscreen display) to see entity representations associated with the "Smart Phone X" representation based on a hierarchy. Based on detecting the interaction with the "Smart Phone X" representation (e.g., by detecting that the user has selected to see the hierarchy) association device 210 may provide the associated "Flip Phone" representation, "Tablet" representation, and "Touch Phone" representation. These entity representations may be displayed in a hierarchical manner, with a parent category (e.g., "Cell Phones"), a grandparent category (e.g., "Communication Devices"), and related categories (e.g., "Landline Phones," and "Computers").

Figure 9:
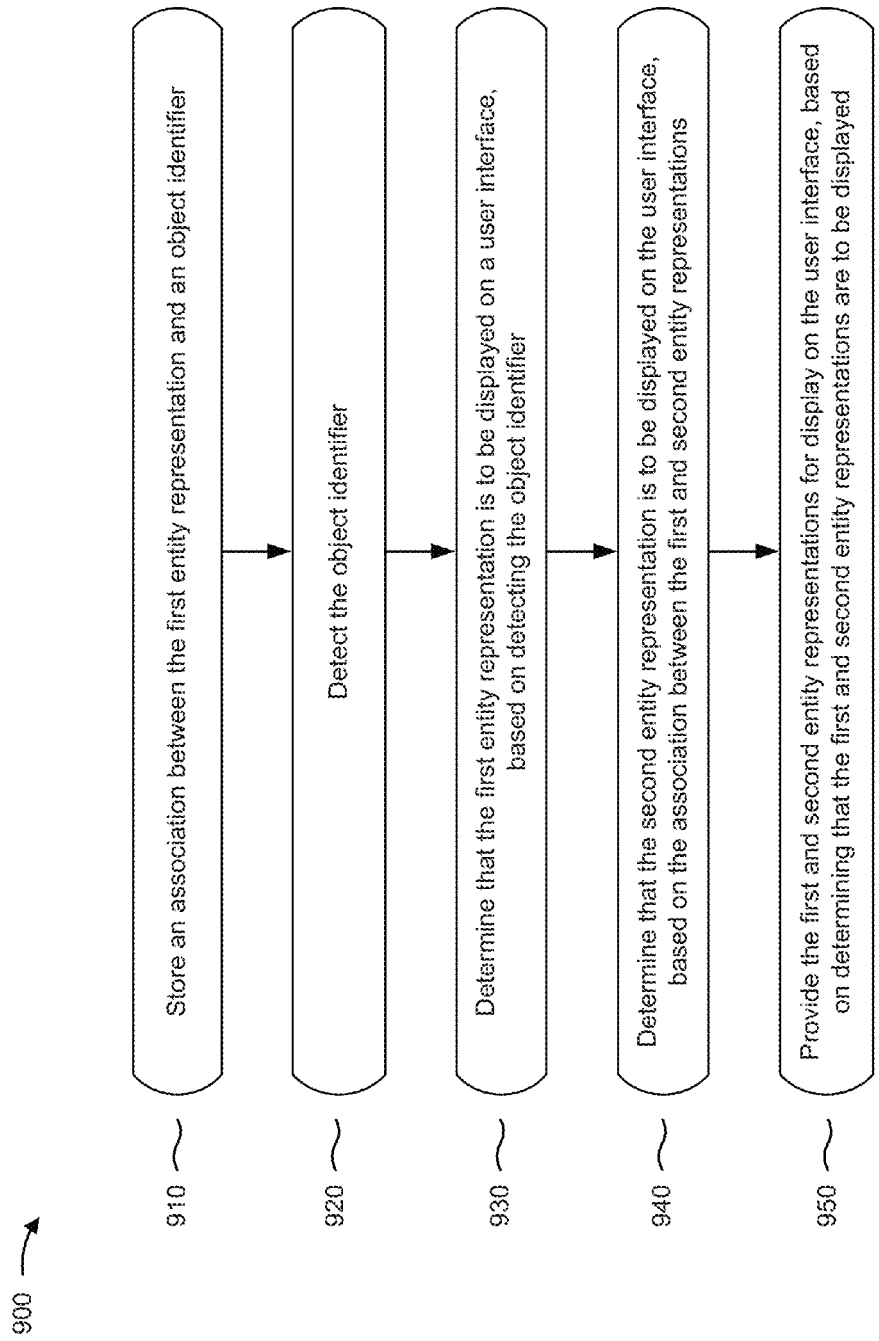
FIG. 9 is a flow chart of an example process for providing the first and second entity representations based on detecting an object identifier.

FIG. 9 is a flow chart of an example process 900 for providing the first and second entity representations based on detecting an object identifier. In some implementations, one or more process blocks of FIG. 9 may be performed by interaction device 220. Additionally, or alternatively, one or more process blocks of FIG. 9 may be performed by another device or a group of devices separate from or including interaction device 220, such as association device 210 and/or entity information server 230.

As shown in FIG. 9, process 900 may include storing an association between the first entity representation and an object identifier (block 910). For example, interaction device 220 may store the association between the first entity representation and the object identifier associated with an object.

In some implementations, the object identifier may include a set of characters (e.g., numbers, letters, symbols, etc.) that identifies an object. Additionally, or alternatively, the object identifier may include a tag, a label, a barcode (e.g., a universal product code (UPC), a quick response (QR) code, etc.), a radio frequency identification (RFID) tag, or the like, that may be affixed to the object. In some implementations, the object identifier may include a set of one or more attributes (e.g., weight, dimension, color, texture, etc.) associated with the object.

In some implementations, the object may include a physical object corresponding to the entity representation. For example, the object may include a particular object (e.g., a particular model of smartphone), and the entity representation may correspond to the particular object (e.g., the entity representation may include a representation of the particular model of smartphone). Additionally, or alternatively, the object may include a three-dimensional shape (e.g., a sphere, a cube, a pyramid, etc.). In some implementations, the object may be associated with an image (e.g., a picture, an icon, a symbol, etc.), a number, a set of characters (e.g., a letter, a word, etc.), or the like, indicating that the object corresponds to the first entity representation.

In some implementations, the object identifier may uniquely identify the object. In some implementations, the object identifier may identify a class of objects.

As further shown in FIG. 9, process 900 may include detecting the object identifier (block 920). For example, interaction device 220 may detect the object identifier. In some implementations, interaction device 220 may detect the object identifier by scanning a tag, a label, a barcode, or the like, associated with the object. Additionally, or alternatively, interaction device 220 may scan a symbol (e.g., a logo, a trademark, a product name, etc.) on the object, and may determine the object identifier based on the symbol.

In some implementations, interaction device 220 may include a display (e.g., a touchscreen display) capable of detecting the object identifier (e.g., a serial number, a product code, etc.) by the use of light waves (e.g., radio waves, radar, etc.). For example, a user may place an object associated with an object identifier on a sensor associated with interaction device 220. Interaction device 220 may detect the object identifier by scanning the object (e.g., using radio waves, radar, etc.) to determine the object identifier.

In some implementations, interaction device 220 may use an RFID reader to detect an object identifier associated with an RFID tag. For example, the object may be associated with an RFID tag that includes the object identifier (e.g., the object identifier may be stored on the RFID tag). A user of the object may use the RFID reader to detect (e.g., scan) the object identifier. Additionally, or alternatively, the user may bring the object within a threshold proximity (e.g., within a certain distance) of the RFID reader, and the RFID reader may detect the object identifier.

In some implementations, interaction device 220 may detect the object. For example, association device 210 and/or interaction device 220 may detect the object by use of a camera (e.g., a still camera, a video camera, etc.), a motion sensor, a heat sensor, a weight sensor (e.g., a scale), or the like. In some implementations, a user of the object may place the object on or near a detector associated with interaction device 220. Interaction device 220 may detect the object (e.g., by taking a picture of the object, weighing the object, etc.).

In some implementations, interaction device 220 may detect two or more object identifiers. For example, interaction device 220 may detect a first object identifier (e.g., associated with a first smartphone) and a second object identifier (e.g., associated with a second smartphone). In some implementations, interaction device 220 may display a first entity representation associated with the first object identifier and a second entity representation associated with the second object identifier. Additionally, or alternatively, interaction device 220 may compare the first and second representations (e.g., compare features associated with the first and second smartphones) by displaying associated entity representations that are the same or different from the first and/or second entity representations.

As further shown in FIG. 9, process 900 may include determining that the first entity representation is to be displayed on a user interface based on detecting the object identifier (block 930). For example, interaction device 220 may determine that the first entity representation is to be displayed on the user interface associated with interaction device 220, based on detecting the object identifier. In some implementations, interaction device 220 may use the association between the first entity representation and the object identifier associated with the object to determine that the first entity representation is to be displayed. For example, interaction device 220 may detect an object identifier (e.g., a RFID tag) associated with an object (e.g., a smartphone). Interaction device 220 may determine that the first entity representation (e.g., a representation of the smartphone) is to be displayed based on the detection, and based on an association between the object identifier and the first entity representation (e.g., an association stored by association device 210).

As further shown in FIG. 9, process 900 may include determining that the second entity representation is to be displayed on the user interface based on the association between the first and second entity representations (block 940). For example, interaction device 220 may determine that the second entity representation is to be displayed on the user interface based on the association between the first and second entity representations. In some implementations, interaction device 220 may detect the interaction with the first entity representation, and may determine associations with entity representations. Interaction device 220 may rank the associations (e.g., by use of a ranking algorithm) to determine which portion of the entity representations are to be displayed.

As further shown in FIG. 9, process 900 may include providing the first and second entity representations for display on the user interface based on determining that the first and second entity representations are to be displayed (block 950). For example, interaction device 220 may determine that the first and second entity representations are to be displayed on a user interface associated with interaction device 220, and may provide the first and second entity representations for display on the user interface. In some implementations, interaction device 220 may provide the first and second entity representations on a display associated with interaction device 220. Additionally, or alternatively, interaction device 220 may provide the first and second entity representations for display on another device, such as association device 210.

While a series of blocks has been described with regard to FIG. 9, the blocks and/or the order of the blocks may be modified in some implementations. Additionally, or alternatively, non-dependent blocks may be performed in parallel.

Figure 10:
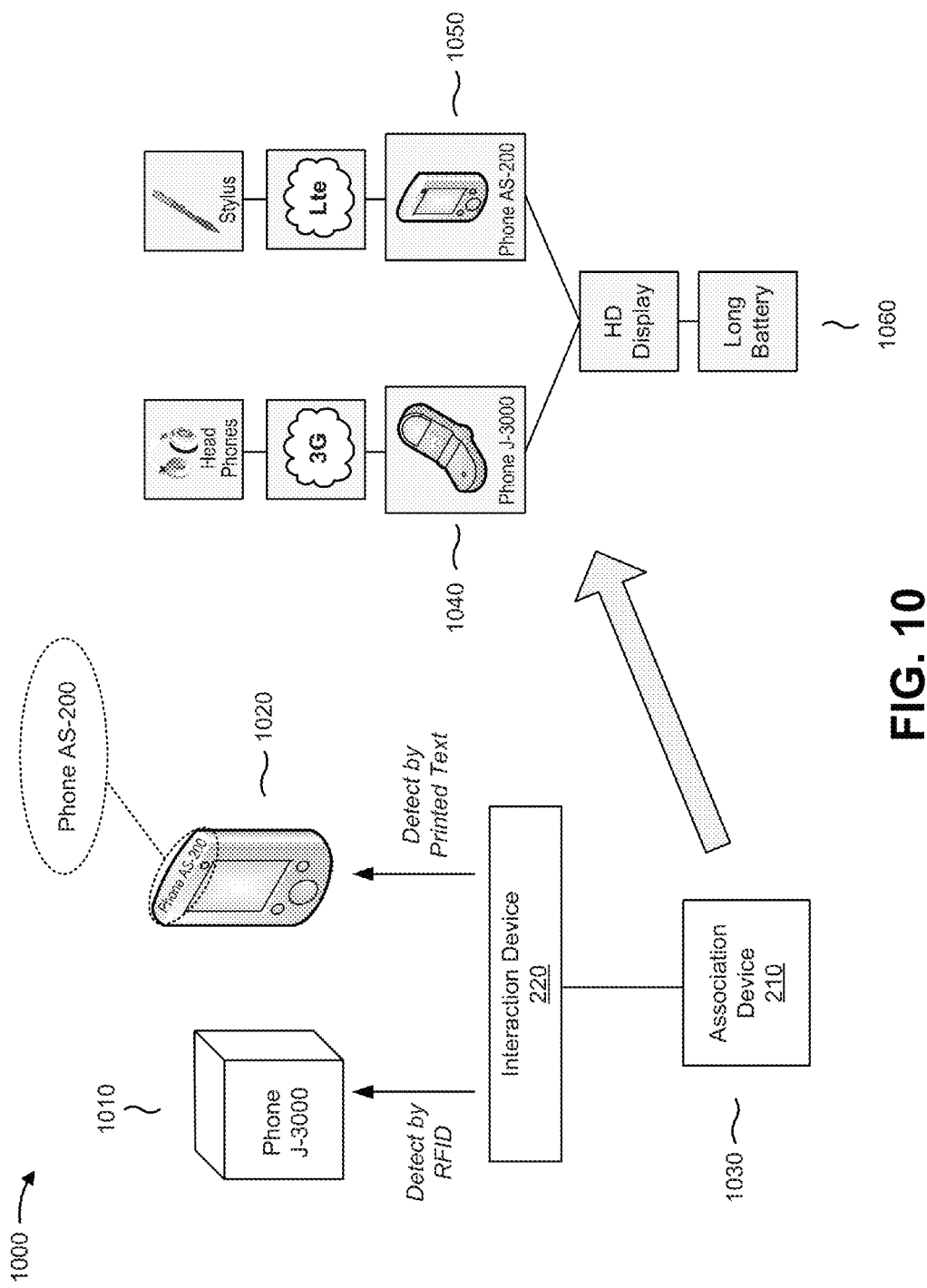
FIG. 10 is a diagram of an example implementation relating to the example process shown in FIG. 9.

FIG. 10 is a diagram of an example implementation 1000 relating to process 900 shown in FIG. 9. In example implementation 1000, interaction device 220 may detect first and second object identifiers associated with first and second objects, respectively. Interaction device 220 may display first and second entity representations, along with associated entity representations, based on detecting the first and second object identifiers.

As shown by reference number 1010, a user may place a cube, with a cellular phone model number, "Phone J-3000," printed on the front, near interaction device 220. The cube may include an RFID tag, and interaction device 220 may detect a first object identifier associated with the RFID tag.

As shown by reference number 1020, the user may also place a cellular telephone, with a model number (e.g., "Phone AS-200") printed on the body of the cellular telephone, near interaction device 220. Interaction device 220 may detect the cellular telephone by taking a picture of the cellular telephone and determining a second object identifier (e.g., "Phone AS-200") based on the picture (e.g., by using image recognition software to determine the second object identifier).

As shown by reference number 1030, interaction device 220 may receive the first and second object identifiers. Interaction device 220 may determine that the first object identifier, identifying the cube, is associated with a "Phone J-3000" representation. Interaction device 220 may determine that the second object identifier, identifying "Phone AS-200," is associated with a "Phone AS-200" representation. Interaction device 220 may provide the "Phone J-3000" representation and the "Phone AS-200" representation for display on a user interface. Interaction device 220 may also provide additional entity representations associated with the "Phone J-3000" and "Phone AS-200" representations.

As shown by reference number 1040, interaction device 220 may display the "Phone J-3000" representation, as well as a "3G" representation and a "Head Phones" representation (e.g., entity representations associated with the "Phone J-3000" representation). As shown by reference number 1050, interaction device 220 may display the "Phone AS-200" representation, as well as an "Lte" representation and a "Stylus" representation (e.g., two entity representations associated with the "Phone AS-200" representation). Additionally, interaction device 220 may display an "HD Display" representation and a "Long Battery" representation associated with both the "Phone J-3000" and "Phone AS-200 representations, as shown by reference number 1060. In this manner, interaction device 220 may display a comparison of similar and different features associated with "Phone J-3000" and "Phone AS-200."

Figure 11A:
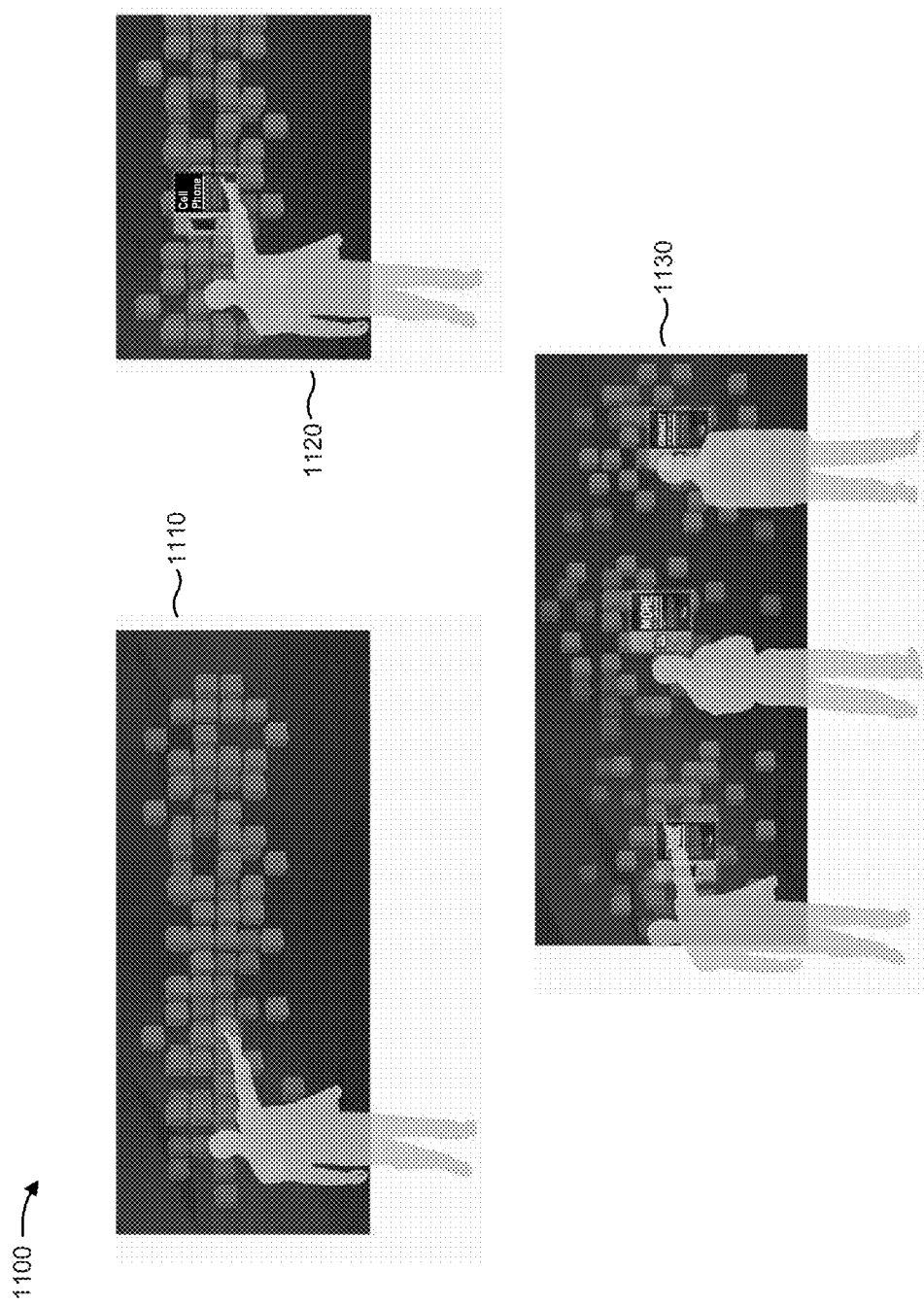

FIGS. 11A and 11B are diagrams of an example implementation 1100 relating to processes 400 and 700 shown in FIG. 4 and FIG. 7, respectively. In example implementation 1100, association device 210 may display multiple entity representations on a touchscreen display. The entity representations may correspond to product cubes (e.g., representations of products and/or services relating to cellular networks). Several users may interact with the product cubes, and association device 210 may provide associated product cubes based on the interactions.

As shown in FIG. 11A, and by reference number 1110, association device 210 may display multiple product cubes on the touchscreen display. Association device 210 may initially display the product cubes in an ambient mode (e.g., a rest mode designed to attract the attention of a user) until a first user interacts with the touchscreen display. As shown by reference number 1120, the first user may select (e.g., by touching the touchscreen display) a product cube associated with a particular cellular telephone model. Association device 210 may display the product cubes in a presenter mode (e.g., a mode for interaction with a user), and may display a description of the cellular telephone model, based on detecting the first user's selection of the product cube.

As shown by reference number 1130, two additional users may begin interacting with the touchscreen display, each by selecting additional product cubes. Based on detecting multiple users, association device 210 may display the product cubes in a multi-user mode (e.g., a mode for multiple users). Association device 210 may divide the touchscreen display into three regions, and each of the three users may interact with product cubes on their associated regions of the touchscreen display.

FIG. 11B is a diagram of a product cube, corresponding to a particular smartphone, which has been selected by a user. As shown by reference number 1140, association device 210 may display the selected product block, along with an image of the smartphone and a description of the smartphone. Association device 210 may display associated product cubes surrounding the selected product cube. The associated product cubes may correspond to products and/or services related to the smartphone.

As shown by reference number 1150, the user may select to view the product block in a hierarchical view. Association device 210 may display the product block, along with an image and description of the smartphone. Association device 210 may display additional product blocks representing smartphones (e.g., in the category of smartphones) in a hierarchical view.

Implementations described herein may allow an association device to form associations between entity representations based on evolving information about the entity representations, and to provide the entity representations based on the associations. Additionally, users may be able to explore the associations between entity representations by manipulating objects corresponding to one or more of the entity representations.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive information that identifies a plurality of entity representations;
      receive first entity information associated with a first entity representation of the plurality of entity representations;
      receive second entity information associated with a second entity representation of the plurality of entity representations;
      generate a first tag, associated with the first entity representation, based on the first entity information;
      generate a second tag, associated with the second entity representation, based on the second entity information;
      determine a relationship between the first tag and the second tag;
      store an association between the first entity representation and the second entity representation based on determining the relationship between the first tag and the second tag;
      store an association between the first entity representation and an object identifier,
         the object identifier being associated with a physical object that is separate from the device;
      detect the object identifier, associated with the first entity representation, using a sensor associated with the device;
      provide the first entity representation and the second entity representation for display based on detecting the object identifier, based on the association between the first entity representation and the object identifier, and based on the association between the first entity representation and the second entity representation
      detect an interaction with a third entity representation provided for display;
      provide the first entity representation and the second entity representation on a first region of the display based on detecting the interaction with the third entity representation; and
      provide the third entity representation on a second region of the display based on detecting the interaction with the third entity representation.

2. The device of claim 1, where the one or more processors, when receiving the first entity information, are to:
   receive at least one of:
      product information associated with the first entity representation;
      product review information associated with the first entity representation; or
      social media statements associated with the first entity representation.

3. The device of claim 1, where the one or more processors, when providing the second entity representation for display, are to:
   provide the second entity representation for display by:
      moving the second entity representation closer to the first entity representation;
      highlighting the second entity representation;
      changing a size of the second entity representation; or
      changing a color of the second entity representation.

4. The device of claim 1, where the one or more processors are further to:
   display the first entity representation and the second entity representation in a first arrangement;
   detect a user interaction associated with the first entity representation; and
   display the first and second entity representations in a second arrangement based on the user interaction,
      where the first arrangement is different from the second arrangement.

5. The device of claim 1, where the one or more processors, when determining the relationship between the first tag and the second tag, are to:
   determine the relationship based on at least one of:
      a parent-child relationship associated with the first entity representation and the second entity representation;
      comparing the first tag and the second tag; or
      detecting a common feature associated with the first entity representation and the second entity representation.

6. The device of claim 1, where the object identifier is affixed to the physical object.

7. The device of claim 1, where the object identifier is provided via the physical object using at least one of:
   a set of characters,
   a label,
   a barcode, or
   a radio frequency identification tag.

8. A non-transitory computer-readable medium storing instructions, the instructions comprising:
   one or more instructions that, when executed by a processor, cause the processor to:
      receive first entity information associated with a first entity representation of a plurality of entity representations;
      receive second entity information associated with a second entity representation of the plurality of entity representations;
      determine a first tag, associated with the first entity representation, based on the first entity information;
      determine a second tag, associated with the second entity representation, based on the second entity information;
      determine a relationship between the first tag and the second tag;
      store an association between the first entity representation and the second entity representation based on determining the relationship between the first tag and the second tag;
      store an association between the first entity representation and an object identifier, the object identifier being affixed to a physical object;
detect the object identifier, associated with the first entity representation, using a sensor;
provide the first entity representation and the second entity representation for display based on detecting the object identifier, based on the association between the first entity representation and the object identifier, and based on the association between the first entity representation and the second entity representation;
detect an interaction associated with a third entity representation provided for display;
provide the first entity representation and the second entity representation via a first segment of the display based on detecting the interaction with the third entity representation; and
provide the third entity representation via a second segment of the display based on detecting the interaction with the third entity representation.

9. The non-transitory computer-readable medium of claim 8, where the one or more instructions, that cause the processor to receive the first entity information, cause the processor to:
receive at least one of:
product information associated with the first entity representation;
a user rating associated with the first entity representation; or
product review information associated with the first entity representation.

10. The non-transitory computer-readable medium of claim 8, where the one or more instructions, that cause the processor to provide the second entity representation, cause the processor to:
provide the second entity representation based on at least one of:
moving the second entity representation closer to the first entity representation;
highlighting the second entity representation;
changing a size of the second entity representation; or
changing a color of the second entity representation.

11. The non-transitory computer-readable medium of claim 8, where the one or more instructions, when executed by the processor, further cause the processor to:
display the first entity representation and the second entity representation in a first arrangement;
detect a user interaction associated with the first entity representation; and
display the first entity representation and the second entity representation in a second arrangement based on the user interaction,
the first arrangement being different from the second arrangement.

12. The non-transitory computer-readable medium of claim 8, where the one or more instructions, that cause the processor determine the relationship between the first tag and the second tag, cause the processor to:
determine the relationship based on at least one of:
a parent-child relationship associated with the first entity representation and the second entity representation;
comparing the first tag and the second tag; or
detecting a common feature associated with the first entity representation and the second entity representation.

13. The non-transitory computer-readable medium of claim 8, where the first entity representation represents the physical object.

14. The non-transitory computer-readable medium of claim 8, where the one or more instructions, that cause the processor to detect the interaction associated with the third entity representation, cause the processor to:
detect the interaction with the third entity representation based on detecting multiple users.

15. A method, comprising:
receiving, by a device, first entity information associated with a first entity representation of a plurality of entity representations;
receiving, by the device, second entity information associated with a second entity representation of the plurality of entity representations;
determining, by the device, a first tag, associated with the first entity representation, based on the first entity information;
determining, by the device, a second tag, associated with the second entity representation, based on the second entity information;
determining, by the device, a relationship between the first tag and the second tag;
storing, by the device, an association between the first entity representation and the second entity representation based on determining the relationship between the first tag and the second tag;
storing, by the device, an association between the first entity representation and an object identifier,
the object identifier being associated with a physical object and being detectable by the device;
detecting, by the device, the object identifier using a sensor associated with the device;
providing, by the device, the first entity representation and the second entity representation for display based on detecting the object identifier, based on the association between the first entity representation and the object identifier, and based on the association between the first entity representation and the second entity representation;
detecting, by the device, an interaction with a third entity representation provided for display;
providing, by the device, the first entity representation and the second entity representation via a first region of the display based on detecting the interaction with the third entity representation; and
providing, by the device, the third entity representation via a second region of the display based on detecting the interaction with the third entity representation.

16. The method of claim 15, where providing the second entity representation comprises:
providing the second entity representation by at least one of:
moving the second entity representation closer to the first entity representation;
highlighting the second entity representation;
changing a size of the second entity representation; or
changing a color of the second entity representation.

17. The method of claim 15, further comprising:
providing the first entity representation and the second entity representation for display in a first arrangement;
detecting a user interaction associated with the first entity representation; and
providing the first entity representation and the second entity representation for display in a second arrangement based on the user interaction,
the first arrangement being different from the second arrangement.

18. The method of claim 15, where determining the relationship between the first tag and the second tag comprises:
determining the relationship based on at least one of:

a parent-child relationship associated with the first entity representation and the second entity representation;

comparing the first tag and the second tag; or detecting a common feature associated with the first entity representation and the second entity representation.

19. The method of claim 15, where the object identifier includes one or more attributes associated with the physical object.

20. The method of claim 15, where the object identifier is a first object identifier;

where the physical object is a first physical object;

where the method further comprises:

storing an association between the second entity representation and a second object identifier, the second object identifier being associated with a second physical object that is different than the first physical object;

detecting the second object identifier; and where providing the first entity representation and the second entity representation for display comprises:

providing the first entity representation and the second entity representation for display based on detecting the second object identifier.

\* \* \* \* \*